United States Patent [19]
Chen et al.

[11] Patent Number: 5,664,316
[45] Date of Patent: Sep. 9, 1997

[54] METHOD OF MANUFACTURING MAGNETORESISTIVE READ TRANSDUCER HAVING A CONTIGUOUS LONGITUDINAL BIAS LAYER

[75] Inventors: Mao-Min Chen; Robert Edward Fontana; Mohamad Towfik Krounbi; Kenneth Ting-Yuan Kung; James Hsi-Tang Lee; Jyh-Shiliey Jerry Lo, all of San Jose; Ching Hwa Tsang, Sunnyvale; Po-Kang Wang, San Jose, all of Calif.

[73] Assignee: International Business Machines Corporation, Armonk, N.Y.

[21] Appl. No.: 438,430
[22] Filed: May 10, 1995

Related U.S. Application Data

[62] Division of Ser. No. 375,045, Jan. 17, 1995, abandoned.

[51] Int. Cl.$^6$ .................................................. G11B 5/127
[52] U.S. Cl. .................. 29/603.08; 29/603.14; 29/603.15; 427/130; 427/131
[58] Field of Search .................. 29/603.08, 603.13, 29/603.14, 603.15, 603.16, 603.17, 603.18; 360/113; 427/128, 130, 131

[56] References Cited

U.S. PATENT DOCUMENTS

| | | | |
|---|---|---|---|
| 3,840,898 | 10/1974 | Bajorek et al. | 360/113 |
| 4,024,489 | 5/1977 | Bajorek et al. | 338/32 R |
| 4,103,315 | 7/1978 | Hempstead et al. | 360/113 X |
| 4,103,415 | 8/1978 | Hayes | 29/571 |
| 4,639,806 | 1/1987 | Kira et al. | 360/113 |
| 4,663,685 | 5/1987 | Tsang | 360/113 |
| 4,771,349 | 9/1988 | Tsang | 360/113 |
| 4,809,109 | 2/1989 | Howard et al. | 360/113 |
| 5,001,586 | 3/1991 | Aboaf et al. | 360/113 |
| 5,018,037 | 5/1991 | Krounbi et al. | 360/113 |
| 5,079,035 | 1/1992 | Krounbi et al. | 427/130 |
| 5,079,663 | 1/1992 | Ju et al. | 360/113 |
| 5,206,590 | 4/1993 | Dieny et al. | 324/252 |
| 5,287,238 | 2/1994 | Baumgart et al. | 360/113 |
| 5,344,669 | 9/1994 | Chen et al. | 427/130 |
| 5,458,908 | 10/1995 | Krounbi et al. | 427/123 |

FOREIGN PATENT DOCUMENTS

| | | |
|---|---|---|
| 0279536A3 | 8/1988 | European Pat. Off. . |
| 0298417A1 | 1/1989 | European Pat. Off. . |
| 0422806A3 | 4/1991 | European Pat. Off. . |
| 0441581A3 | 8/1991 | European Pat. Off. . |
| 0558237A2 | 9/1993 | European Pat. Off. . |
| 64001112 | 5/1989 | Japan . |

*Primary Examiner*—Timothy V. Eley
*Attorney, Agent, or Firm*—Leslie G. Murray

[57] ABSTRACT

A magnetoresistive (MR) read transducer having passive end regions separated by a central active region in which an MR layer is formed over substantially only the central active region and in which a magnetic bias layers is formed in each passive end region. Each of the magnetic bias layers includes a layer of ferromagnetic material and a layer of antiferromagnetic material overlaying and in contact with the ferromagnetic layer to provide an exchange-coupled magnetic bias field. Each of the magnetic bias layers form an abutting junction having magnetic and electrically continuity with the MR layer to produce a longitudinal magnetic bias field in the transducer.

14 Claims, 4 Drawing Sheets

METHOD OF MANUFACTURING MAGNETORESISTIVE READ TRANSDUCER HAVING A CONTIGUOUS LONGITUDINAL BIAS LAYER

This is a divisional of application Ser. No. 08/375,045, filed on Jan. 17, 1995 which is now abandoned, entitled "Magnetoresistive Read Transducer Having A Contiguous Longitudinal Bias Layer", in the name of M. M. Chen, R. E. Fontana, M. T. Krounbi, K. T. Kung, J. H. Lee, J. Lo, C. H. Tsang and P. K. Wang.

BACKGROUND OF THE INVENTION

The present invention relates generally to thin film magnetic transducers and, more particularly, to magnetic transducers having a magnetoresistive read transducer utilizing ferromagnetic/antiferromagnetic exchange-coupled bias.

The use of magnetoresistive (MR) sensors to sense magnetically recorded data is well-known in the art. It is also well-known that both longitudinal and transverse bias fields must be provided in the MR sensing element to eliminate Barkhausen noise and to maintain the sensor in its most linear operating range. Commonly assigned U.S. Pat. Nos. 4,024,489; 3,840,898 and 4,103,415 disclose MR sensors which utilize various biasing schemes including the use of both hard and/or soft magnetic materials to provide the longitudinal and transverse bias magnetic fields required by the MR sensing element.

It has become increasingly difficult to fabricate MR read transducers in the small physical size required to read data recorded on ever decreasing track widths at ever increasing linear recording density. One solution proposed to meet these requirements is described in commonly assigned U.S. Pat. No. 4,663,685 in which a transverse bias field is produced in only a central active region of the MR sensor element and a longitudinal bias field is produced in the inactive end regions by means of exchange coupling between the portions of the ferromagnetic MR element which extends into the end regions and layers of antiferromagnetic material which extend only over the end regions of the MR element. U.S. Pat. No. 4,639,806 discloses an MR sensor which provides a longitudinal bias field produced by ferromagnetic exchange coupling between the MR layer and hard magnetic layers in the sensor end regions only. Commonly assigned U.S. Pat. No. 5,079,035 discloses an MR sensor in which the ferromagnetic MR element extends over only the central active region of the sensor. A layer of hard magnetic material is provided in each of the sensor end regions which forms an abutting junction with the ends of the MR element to provide a longitudinal magnetic bias field in the sensor. The central active region includes the MR element, a non-magnetic spacer layer and an adjacent soft magnetic layer which provides a transverse magnetic bias field for the sensor.

The MR sensor design described in U.S. Pat. No. 5,079,035 has been shown to meet present requirements and provides numerous advantages including, data track definition by a single photolithography process step, controllable and reproducible etch step of the sensor active region trilayer etch process, easily adjustable longitudinal bias field, and substantially no side reading. The contiguous or abutting junction hard bias design suffers from a substantial disadvantage at relatively narrow data track widths where the length of the MR sensor active region can be comparable to or even small compared to the length of the junction which can cause the magnetic properties in the junction region to no longer be predictable or well-defined. As a result, under transverse field excitation, hysteresis can be introduced into the sensor's response. However, at large data track widths where the length of the MR sensor active region is large compared to the length of the junction region, any resulting hysteresis is typically not detectable. In addition, the magnetization of a cobalt (Co) alloy hard ferromagnetic material, when grown on different substrates, such as the trilayer active region of the sensor at the overlayping junction region, causes a majority of the Co c-axes to be oriented perpendicular to the film plane. Thus after initialization with a longitudinal magnetic field, such a hard ferromagnetic layer will have substantially no remnant magnetization and the magnitude of the longitudinal bias field thus produced can be insufficient to insure a single domain state in the sensor.

SUMMARY OF THE INVENTION

It is therefore a principal object of the present invention to provide a magnetoresistive (MR) read transducer in which an MR layer extends over substantially only a central active region of the transducer and a magnetic bias layer is provided in each end region of the transducer which forms an abutting junction with the MR layer to produce a longitudinal magnetic bias field in the MR transducer.

It is a further object of the present invention to provide a MR read transducer in which the magnetic instabilities at the junction between the MR layer and the magnetic bias layer are minimized.

In accordance with the principles of the present invention, an MR read transducer comprises an MR sensor having passive end regions separated by a central active region. A MR layer of ferromagnetic material is formed which extends over substantially only the central active region of the sensor. First and second magnetic bias layers are formed, each magnetic bias layer extending over substantially only one of the passive end regions of the sensor and forming an abutting junction having magnetic and electrical continuity with one end of the MR layer and providing a longitudinal magnetic bias field in the MR layer. In a preferred embodiment, the magnetic bias layers each comprises a layer of ferromagnetic material and a layer of antiferromagnetic material overlaying and in physical contact with the ferromagnetic layer to provide an exchange-coupled magnetic bias field for the sensor.

A preferred method of manufacturing the MR read transducer of the present invention comprises the steps of depositing an MR layer of ferromagnetic material over at least the central active portion of the transducer, producing a bi-layer resist stencil covering the central active region of the transducer, and etching away the portions of the MR layer not covered by the stencil. A magnetic bias layer comprising a layer of a ferromagnetic material covered with a layer of antiferromagnetic material is then deposited over regions of the transducer not covered by the stencil to form the passive end regions of the transducer with the magnetic bias layer forming an abutting junction with one end of the MR layer material such that an exchange-coupled longitudinal magnetic bias field is produced in the transducer.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which.

DETAILED DESCRIPTION OF THE PREFERRED EMBODIMENTS

Figure 1:
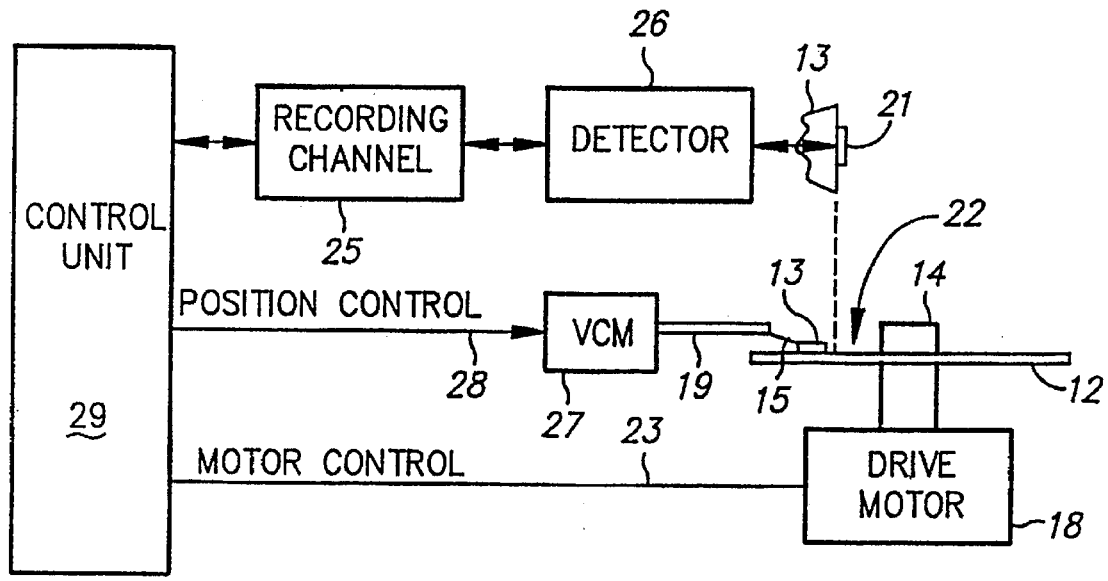
FIG. 1 is a simplified block diagram of a magnetic disk storage system embodying the present invention.

Referring now to FIG. 1, although the invention is described as embodied in a magnetic disk storage system as shown in FIG. 1, it will be apparent that the invention is also applicable to other magnetic recording systems such as a magnetic tape recording system, for example. At least one rotatable magnetic disk 12 is supported on a spindle 14 and rotatedby a disk drive motor 18. The magnetic recording media on each disk is in the form of an annular pattern of concentric data tracks (not shown) on disk 12.

At least one slider 13 is positioned on the disk 12, each slider 13 supporting one or more magnetic read/write transducers 21, typically referred to as read/write heads. As the disks rotate, the sliders 13 are moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means as shown in FIG.1 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 12 generates an air bearing between the slider 13 and the disk surface 22 which exerts an upward force or lift on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25. Detector 26 detects resistance changes in the magnetoresistive read element of read/write head 21.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
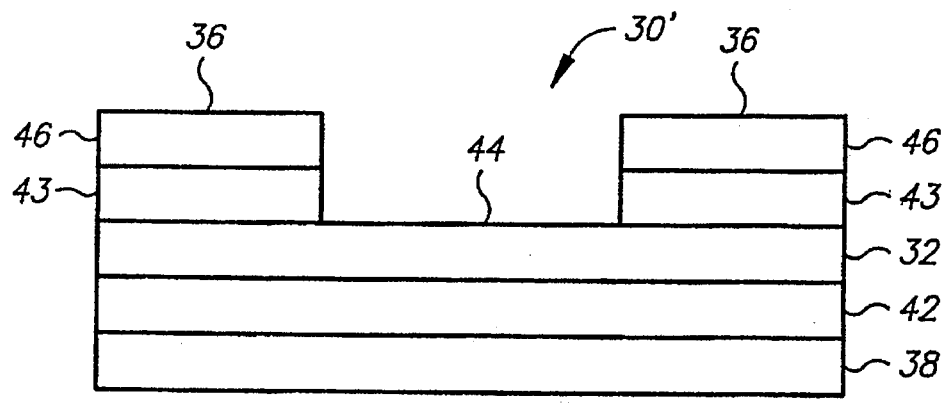
FIG. 2 is a cross-sectional view of a prior art magnetoresistive read transducer in which longitudinal bias is provided by bias layers formed in the transducer end regions only.

Referring now to FIG. 2, a prior art MR read transducer of the type described in commonly assigned U.S. Pat. No. 4,663,685 comprises an MR layer 32 which extends over the entire transducer 30'. A longitudinal bias layer 43 extends over the transducer end regions 36 only to produce a longitudinal bias field in the transducer. A layer 38 of soft magnetic material, separated from the MR layer 32 by a thin non-magnetic spacer layer 42, produces a transverse magnetic bias field in at least a portion of a central active region 44 of the transducer 30'. The read signal is sensed over the central active region 44 which is defined in transducer 30' by the spacing between lead conductors 46 deposited over the longitudinal bias layer 43.

Figure 3:
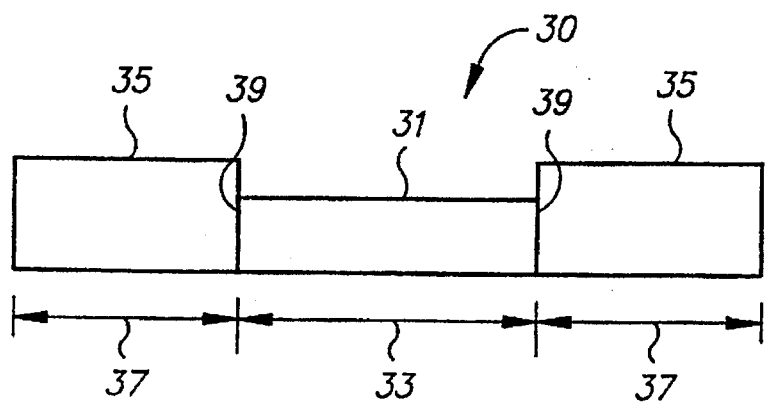
FIG. 3 is a conceptual cross sectional view of an MR read transducer according to the principles of the present invention.
Figure 7:
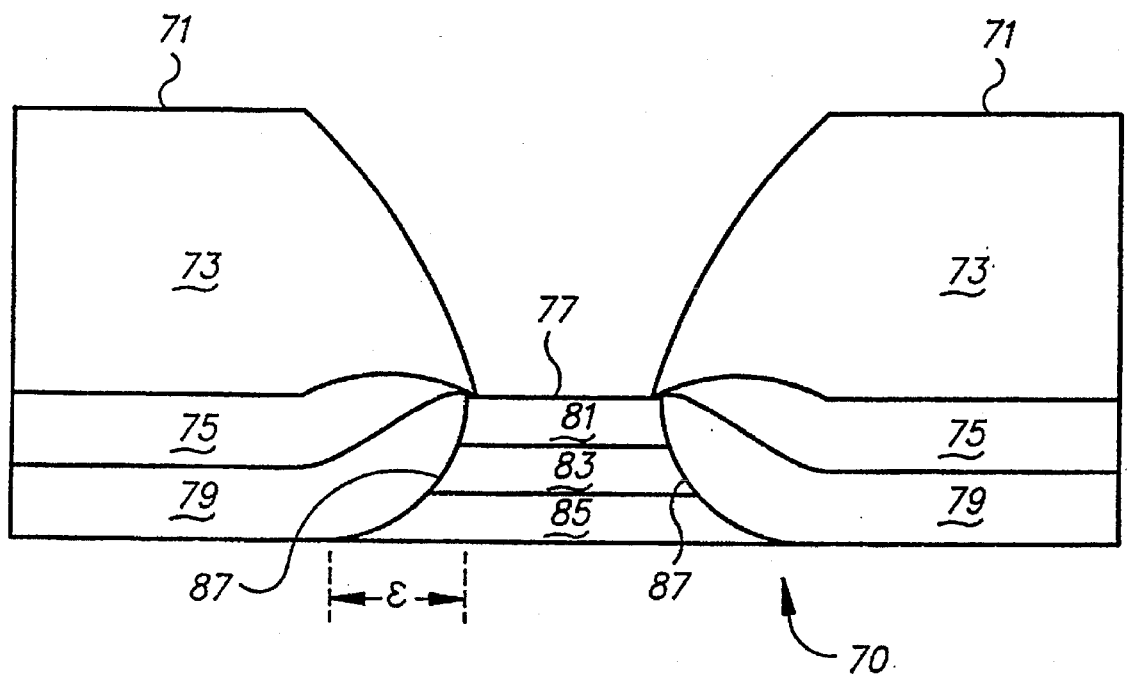
FIG. 7 is a cross-sectional view of a second preferred embodiment of an MR read transducer produced in accordance with the process illustrated in FIGS. 4 and 5.

Referring now to FIG. 3, a conceptual view of a magnetoresistive (MR) read transducer according to the present invention is shown. The MR read transducer 30 comprises a layer of ferromagnetic material forming an MR element 31 which extends over substantially only a central active region 33 of the transducer and a magnetic bias layer 35 formed in each end region 37 which forms an abutting junction 39 with the MR element 31 to produce a longitudinal magnetic bias field in the MR read transducer 30. Since the MR element 31 extends only over the central active region 33 of the transducer 30, additional side-reading suppression components are not required in this preferred embodiment. Thus, the longitudinal bias layer 35 in each end region 37 need only provide for electrical and magnetic continuity to the MR element 31. The longitudinal bias layer 35 may be a single layer of magnetically hard material such as cobalt-chromium (CoCr), cobalt-platinum (CoPt) or cobalt-chromium-platinum (CoCrPt), for example, although the use of under— and/or overcoats Such as tungsten (W) or gold (Au) may be desirable. Alternatively, the longitudinal bias field can be provided by ferromagnetic/antiferromagnetic exchange coupling wherein the longitudinal bias layer 35 comprises a layer 75 of antiferromagnetic material overlaying and in physical contact with a layer 79 of ferromagnetic material (as shown in FIG. 7). For example, the longitudinal bias layer 35 can comprise a bilayer of manganese-iron/nickel-iron (MnFe/NiFe) or a bilayer of manganese-nickel/nickel-iron (MnNi/NiFe). As is known in the art, a transverse magnetic bias field is also required in the central active region 33. The transverse bias field can be provided by an adjacent soft magnetic layer, shunt bias, or other compatible transverse bias techniques. For simplicity, the transverse bias structure has not been shown in the conceptual view of FIG. 3.

Figure 4A:
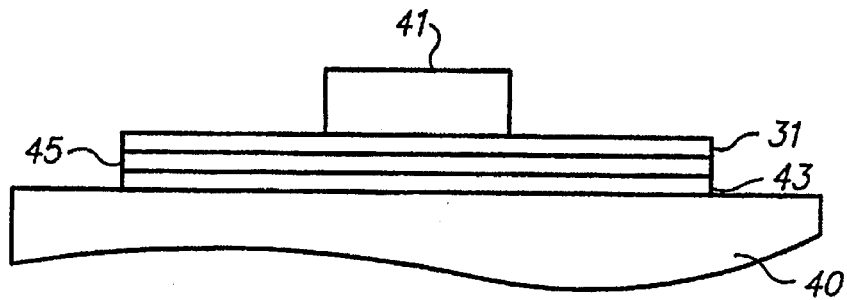
FIGS. 4a–4d is a diagram illustrating a specific embodiment of a process for fabricating a contiguous junction MR transducer according to the principles of the present invention.
Figure 4B:
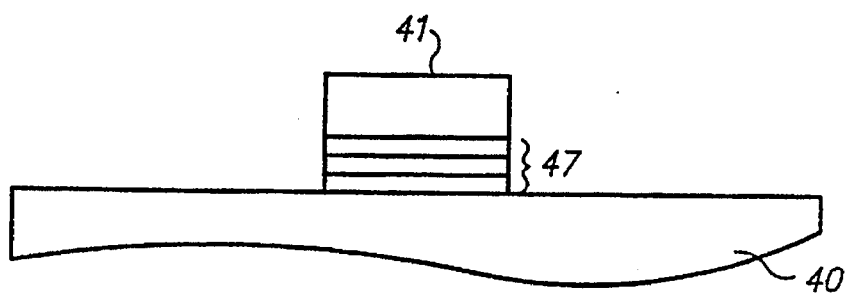
Figure 4C:
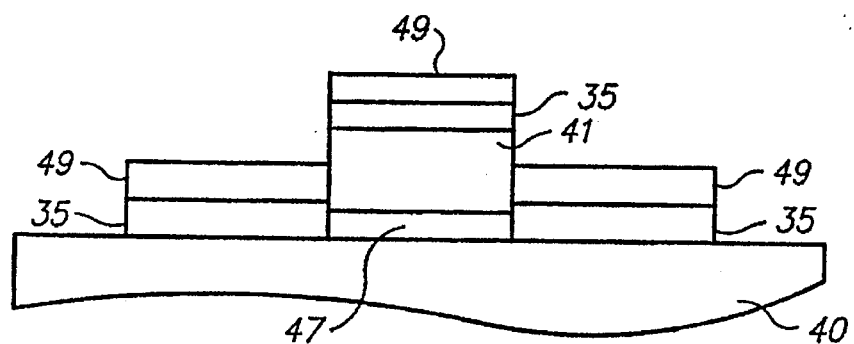
Figure 4D:
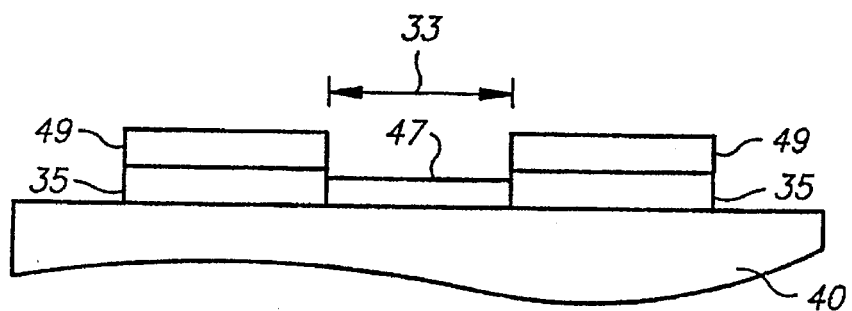

Referring now also to FIGS. 4a–4d, a preferred embodiment of a process for fabricating a suitable abutting or contiguous junction between the MR element 31 and the longitudinal bias layer 35 is illustrated. The process according to the present invention comprises the steps of depositing, upon a suitable substrate 40, an MR layer of ferromagnetic material such as NiFe, for example, over the length of the transducer. in the embodiment shown, a transverse bias structure comprising a soft magnetic layer 43 and a non-magnetic spacer layer 45 are deposited on substrate 40 prior to depositing of the MR layer 31. The process then continues by depositing a layer of a suitable material such as a photoresist, and patterning the photoresist material to form a stencil 41 (FIG. 4a). Stencil 41 is used to define each edge of the MR layer 31 as the layer of MR material 31 as well as the spacer layer 45 and the soft magnetic layer 43 are subjected to a subtractive process such as sputter etching, ion milling or chemical etching to produce an MR trilayer structure 47 (FIG. 4b). The material for the longitudinal bias layers 35 is then deposited as stencil 41 again defines the edges of the bias layers 35 (FIG. 4c). Using the same stencil 41, a layer of conductive material is then deposited to produce the sensor conductor leads 49. If desired, conductor leads 49 can be deposited in a later step if the conductor leads 49 are not coextensive with the longitudinal bias layers 35. Note that a quantity of magnetic material and lead material is also deposited on the top surface of stencil 41. However, this quality of material is removed, along with stencil 41 in a lift-off process (FIG. 4d) as is known in the art to produce an MR sensor or transducer having longitudinal bias layers 35 in the end regions only, each having a contiguous, abutting junction with the MR trilayer structure 47 which extends over only the central active region 33.

Although a vertical, square butted junction between the MR trilayer 47 and the longitudinal bias layer 35 is shown conceptually in FIGS. 3 and 4, the preferred embodiments comprise a junction in which the topography is well-controlled so that a desired junction configuration can be easily and reliably produced.

Figure 5:
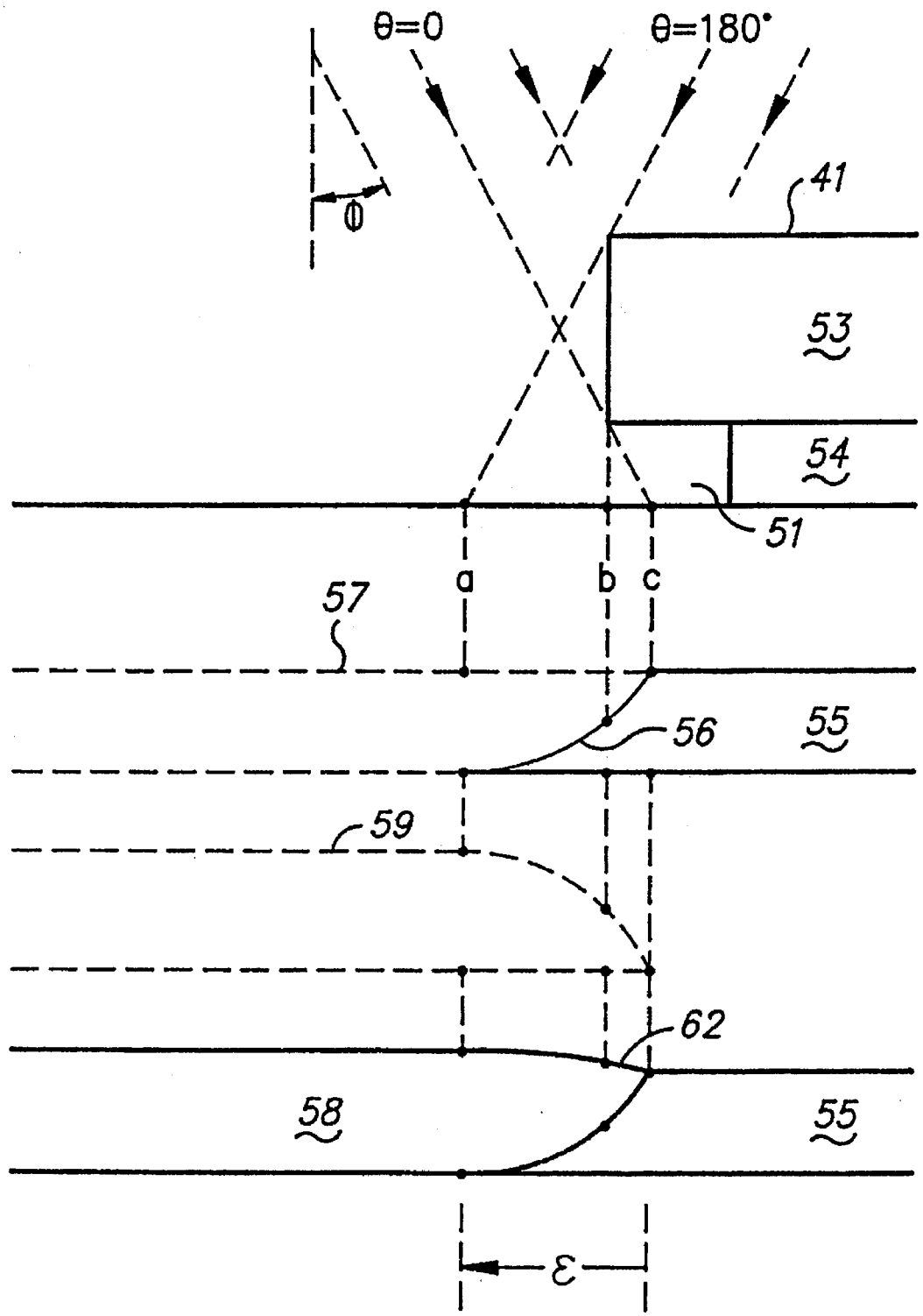
FIG. 5 is an exploded diagram illustrating in greater detail the formation of the contiguous junction according to a preferred embodiment of the present invention.

Referring now also to FIG. 5, the formation of the contiguous junction according to an embodiment of the present invention is illustrated in greater detail. In the embodiment shown in FIG. 5, the stencil 41 comprises a bi-layer resist formed by a relatively thin underlayer 54 and a thick imaging layer 53. One exposure and one develop step defines the edge profile of the resist. An undercut 51 is created by dissolution of the underlayer 54 in a suitable developer with the undercut distance determined by the develop time.

The unmasked areas of the layer 55 of MR material are then removed by the use of a unidirectional process such as ion milling, for example. The angle of incidence Φ is controlled by suitably tilting the substrate relative to the incident beam. In addition, circular symmetry is obtained by rotating the substrate so that any given point sees the incident beam rotate conically about the azimuth angle Φ except near the stencil 41 whose edge shadows the layer 55 during some segment of substrate revolution. As shown in FIG. 5, for an azimuth angle of 0 degrees, there is exposure of the layer 55 to point c and the exposure limit point moves progressively to the left until at an azimuth angle of 180 degrees the exposure limit point is moved to point a. The combined milling for this embodiment produces a curved taper 56 as a result of the removal during the milling process of the portion 57 of the layer 55 shown in the dashed lines.

The longitudinal bias layer 58 is then deposited, by sputter deposition, for example, during a similar orientation and rotation of the substrate to produce a deposition profile such as that shown by dashed lines 59. The combined junction profile resulting from the deposition of bias layer 58 is shown in full line. Still using the same stencil 41, conductor leads 73 (as shown in FIG. 7) can also be deposited in this sequence of steps. Although the longitudinal bias layer 58 is shown as a single layer in FIG. 5, it will be recognized that the longitudinal bias layer may comprise multilayers, such as a layer of ferromagnetic material overlaid by a layer of antiferromagnetic material to provide a longitudinal bias field by ferromagnetic/antiferromagnetic exchange coupling, for example. Similarly, the MR layer 55 may comprise multiple layers, such as the MR trilayer 47 forming a transverse bias structure, for example.

The junction profile 62 comprises two overlapping tapers. The taper profile is determined by the height of the stencil 41 and the selected angle of incidence Φ. For electrical reliability, the length of the junction overlap ε should be relatively long; however, for magnetic reliability the length of the junction overlap ε should be relatively short. Thus, the selected length of the junction overlap is a trade off in which typically the magnetic reliability is more heavily weighted than the electrical reliability. To produce relatively short overlap lengths, overmilling at low angles of incidence Φ prior to deposition of the bias layer 58 may be required.

Figure 6:
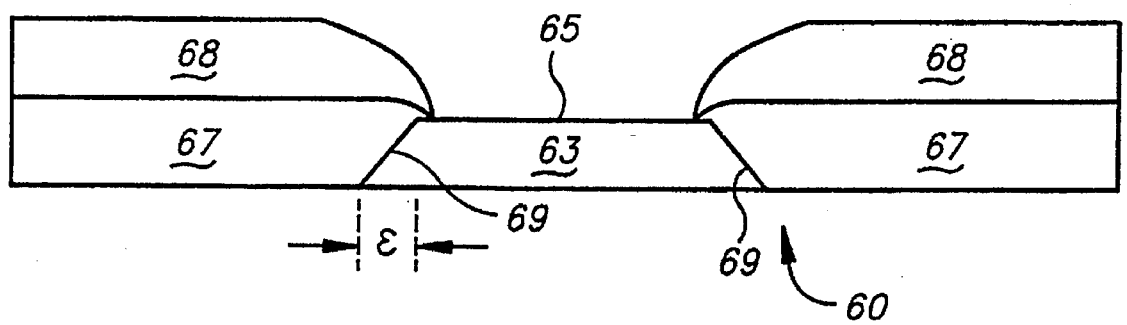
FIG. 6 is a cross-sectional view of a preferred embodiment of an MR read transducer produced in accordance with the process illustrated in FIGS. 4 and 5.

Referring now also to FIG. 6, a cross-sectional view of a preferred embodiment of an MR read transducer fabricated by the above-described method is shown, the surface of which is in close proximity to a magnetic recording medium from which previously recorded magnetic data is to be read. The transducer 60 comprises an MR element 63 which extends over the central active region 65 of the transducer, and hard magnetic bias layers 67 which form abutting junction 69 with the MR element 63. The hard magnetic bias layers 67 extend over the end regions 61 of the transducer to produce a longitudinal magnetic bias field in the MR element 63. In this preferred embodiment, the MR element 63 can comprise a trilayer structure including a layer of ferromagnetic material, such as NiFe, for example, a spacer layer of a nonmagnetic material, such as tantalum (Ta), for example, and a layer of soft magnetic material, such as NiFeRh, for example. The soft magnetic layer is separated from the MR layer by the spacer layer and provides the transverse bias field for the MR element 63. The hard magnetic bias layers 67 comprise a single layer of a hard magnetic material, such as CoCrPt, for example. Since in the junction region 69 where the hard magnetic material overlaps and is grown on soft ferromagnetic and nonmagnetic materials, regions of varying coercivity and magnetic instability exist, for magnetic reliability, it is necessary that the length of the overlap ε be relatively short. In a specific embodiment, the stencil 41 height was about 1 µm and the angle of incidence Φ was about 10 degrees with an overmill of 5 percent. This selected combination produced a junction length ε of less than 0.1 µm. For this particular embodiment, junction lengths within the range of 0<ε<0.1 µm are suitable for use with transducers utilizing hard magnetic bias layers to produce the longitudinal bias field. To ensure good electrical reliability between the MR element 63 and the bias layer 67, the undercut 51 of stencil 41 (as shown in FIG. 5) can be adjusted to provide some overlap 64 of the conductor leads 66 with the MR element 63.

Referring now also to FIG. 7, a cross-sectional view of a second embodiment of an MR read transducer 70 fabricated by the method described with reference to FIG. 5 is shown. The MR transducer 70 comprises a multilayer MR element which extends over the central active region 77 of the transducer, and a bilayer exchange coupled bias layer 75/79 deposited in each end region 71 which form abutting junctions 87 with the MR element. The bias layers 75/79 extend over the end regions 71 of the transducer to produce a longitudinal magnetic bias field in the MR element. The bias layers comprise a layer 75 of antiferromagnetic material, such as MnFe or MnNi, for example, overlaying and in contact with a layer 79 of a ferromagnetic material, such as NiFe, for example. In this preferred embodiment, the MR element comprises a trilayer structure including a layer 81 of ferromagnetic material, such as NiFe, for example, a spacer layer 83 of a nonmagnetic material, such as tantalum (Ta), for example, and a layer 85 of soft magnetic material, such as NiFeRh, for example. The soft magnetic layer 85 is separated from the MR layer 81 by the spacer layer 83 and provides the transverse bias field for the MR element. Unlike the magnetization in the hard magnetic material utilized for the bias layers in the preferred embodiment described with reference to FIG. 6, the magnetization in a ferromagnetic layer exchange-coupled to an antiferromagnetic layer will not change irreversibly, and thus will not cause any hysteric response with application of a transverse magnetic bias field. Similarly, the magnetization in a ferromagnetic/ antiferromagnetic couple will not vary with the substrate on which it is grown, and thus will not diminish when grown on the overlap region ε of the junction 87. Therefore, in a transducer which employs antiferromagnetic/ferromagnetic exchange coupling to provide the longitudinal bias field, magnetic instability in the junction region is not a problem and a relatively long overlap length ε at the junction 87 can be used to ensure electrical contact and reliability. In a specific embodiment, the stencil 41 height was about 1 μm and the angle of incidence Φ was in the range of about 70 to 80 degrees. This selected combination produced a junction length ε of about 5 times the thickness of the MR element. For this particular embodiment, junction lengths ε within the range of 3 to 5 times the MR element thickness are suitable for use with transducers utilizing antiferromagnetic/ferromagnetic exchange-coupled bias layers to produce the longitudinal bias field. As described above, conductor leads 71 can be deposited in the same sequence of process steps as the MR element and the bias layers, or alternatively, can be deposited in subsequent steps.

While the present invention has been particularly shown and described with reference to preferred embodiments thereof, it will be understood by those skilled in the art that various changes in the form and details may be made therein without departing from the spirit and scope of the invention as defined in the appended claims.

We claim:

1. A method for manufacturing a magnetoresistive read transducer having end regions separated by a central active region comprising the steps of:

depositing a first layer of ferromagnetic material on a substrate;

forming a stencil which covers at least a portion of said first layer of ferromagnetic material which defines a central active region of said transducer;

etching away portions of said first layer of magnetoresistive material not covered by said stencil to form a magnetoresistive element extending over said central active region of said transducer;

depositing a second layer of ferromagnetic material over end regions of said transducer not covered by said stencil; and depositing a layer of antiferromagnetic material over said end regions of said transducer not covered by said stencil, said layer of antiferromagnetic material overlaying and in contact with said second layer of ferromagnetic material, said layers of antiferromagnetic and ferromagnetic material forming an exchange-coupled bias layer extending over said end regions of said transducer, said exchange-coupled bias layer in each of said end regions forming an abutting junction with one end of said magnetoresistive element, said exchange-coupled bias layers producing a longitudinal magnetic bias field in said transducer.

2. The method as in claim 1 wherein said abutting junction comprises overlapping tapered portions of said magnetoresistive element and said bias layer.

3. The method as in claim 2 wherein the length of said overlapping junction is about five time the thickness of said magnetoresistive element.

4. The method as in claim 2 wherein the length of said overlapping junction is within the range of about three to five times the thickness of said magnetoresistive element.

5. The method as in claim 1 wherein said etch step comprises the use of a directional etching method.

6. The method as in claim 5 wherein said directional etching method comprises ion beam milling.

7. The method as in claim 5 wherein said directional etching method is carried out at an angle to said transducer.

8. The method as in claim 7 wherein said angle is within the range of about seventy to eighty degrees.

9. The method as in claim 7 wherein said transducer is rotated in a plane normal to said angle during said etching step.

10. The method as in claim 1 wherein said stencil comprises a photoresist material.

11. The method as in claim 10 wherein said photoresist material comprises a thin underlayer and a thick imaging layer overlaying said thin underlayer.

12. The method as in claim 11 wherein said underlayer is undercut.

13. The method as in claim 1 further comprising the step of depositing means for producing a transverse magnetic bias field in at least a portion of said central active region.

14. The method as in claim 13 wherein said means for producing a transverse magnetic bias field comprises a layer of soft magnetic material spaced from said magnetoresistive element.

* * * * *